E. G. JOHANSON.
POWER TRANSMISSION MECHANISM.
APPLICATION FILED NOV. 25, 1918.
1,360,533.
Patented Nov. 30, 1920.
3 SHEETS—SHEET 1.
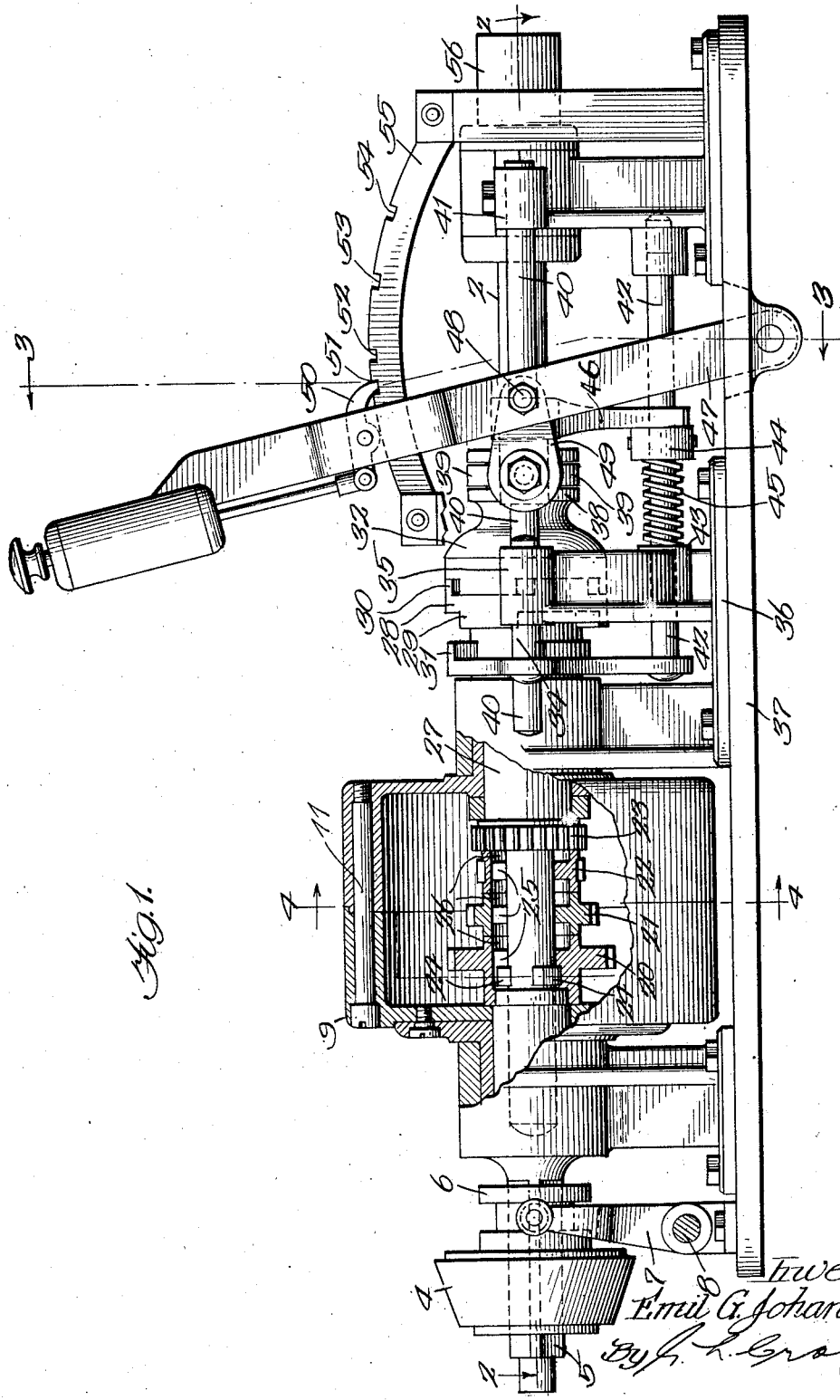
Inventor:
Emil G. Johanson

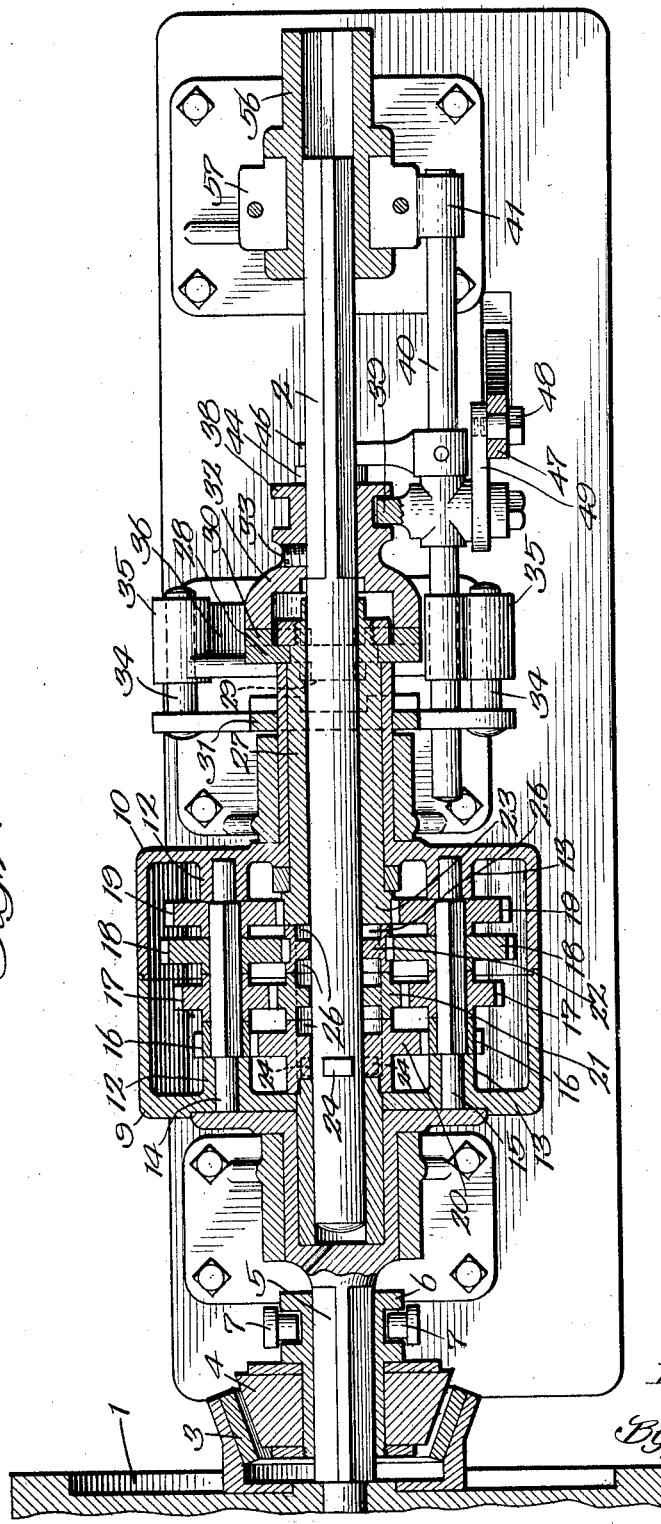

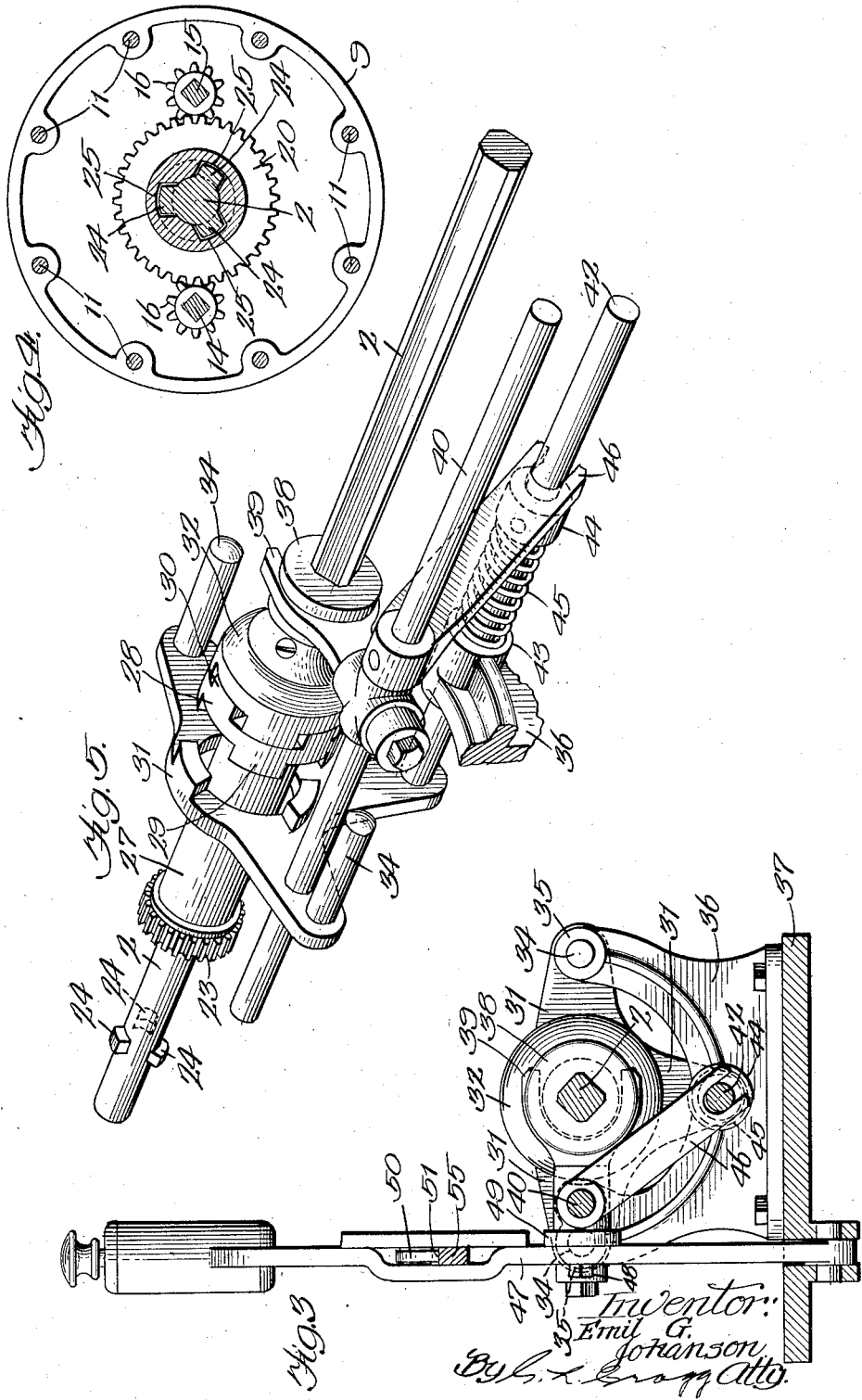

UNITED STATES PATENT OFFICE.

EMIL G. JOHANSON, OF CHICAGO, ILLINOIS, ASSIGNOR TO JAMES McLAUGHLIN, OF CHICAGO, ILLINOIS.

POWER-TRANSMISSION MECHANISM.

1,360,533.  Specification of Letters Patent.  Patented Nov. 30, 1920.

Application filed November 25, 1918. Serial No. 264,059.

*To all whom it may concern:*

Be it known that I, EMIL G. JOHANSON, citizen of the United States, residing at Chicago, in the county of Cook and State of Illinois, have invented a certain new and useful Improvement in Power-Transmission Mechanism, of which the following is a full, clear, concise, and exact description.

My invention relates to power transmission mechanism employing speed changing gearing and has a number of objects and advantages in view. Among these objects is the provision of improved means for directly coupling a driving element with a driven element to transmit speed at the rate of rotation of the driving element, there being means for changing from this direct driving relation to a driving relation that is effected by gearing and which means permits of the employment of this gearing without any violent or knocking action accompanying the change.

The invention has for another of its objects the provision of improved means for disconnecting the load shaft or member from the gearing commonly called placing the structure in " neutral."

The invention has for its further object the provision of improved clutching mechanism for effecting the adjustment of the gearing with respect to the driving and driven elements.

The foregoing and other characteristics of my invention will be fully set forth by reference to the accompanying drawings showing the preferred embodiment of the invention and in which Figure 1 is a side view, partially broken away, of a mechanism constructed in accordance with the invention; Fig. 2 is a sectional view on line 2—2 of Fig. 1; Fig. 3 is a sectional view on line 3—3 of Fig. 1; Fig. 4 is a sectional view on line 4—4 of Fig. 1; and Fig. 5 is a perspective view of a part of the structure.

Like parts are indicated by similar characters of reference throughout the different figures.

As the invention is illustrated the driving force is furnished by the fly wheel 1 of an engine or other prime mover which is brought into driving relation with a load shaft 2 but it will be obvious that the power could be transmitted from the shaft 2 to the load having the position of the fly wheel 1. Some suitable form of clutching mechanism is desirably employed between the fly wheel 1 and the load to be operated thereby. The clutching mechanism illustrated for this purpose includes a clutch member 3 carried upon the fly wheel and a clutch member 4 slidably mounted upon the square shaft 5 that turns therewith. The clutch member 4 has a clutch collar 6 provided with a groove that receives the prongs of a fork 7. This fork is mounted upon a shaft 8 which may be turned by a suitable lever, not shown. The square shaft 5 is in fixed relation with a gear casing or carrier which is made up of two parts 9 and 10 that are bolted together by bolts 11. This gear casing is desirably cylindrical and is co-axial with the shaft 5. It carries two alined bearings 12 upon one side of and parallel with its axis and two alined bearings 13 upon the other side of and also parallel with its axis, the bearings 13 being diametrically opposite the bearings 12. Shafts 14 and 15 are journaled to rotate in said bearings. These shafts are of square cross section except where they are supported by their bearings.

Spur gears 16, 17, 18 and 19 are provided with central openings that fit the square portions of the shafts whereby these gears turn with the shafts. Each gear 16 takes part in producing the highest speed obtainable through any of the gearing, there being preferably a still higher speed which is produced when the prime mover and load are directly coupled as hereinafter specified. Each gear 17 takes part in producing the next lower speed obtainable by means of gearing. Each gear 18 takes part in producing a reversal in the direction of rotation of the load and the gears 19 enable the other gears to function as will appear. Spur gears 20, 21, 22 and 23 are desirably co-axial with the shaft 5 and are relatively and freely rotatable under certain adjustments of the mechanism. In other adjustments of the mechanism these gears, or any selected one of them, act to transmit power. The gears 16 mesh with and operate through the gear 20 to transmit power at the highest gear speed. The gears 17 mesh with and operate through the gear 21 to transmit power at a lower gear speed. Gears 18 mesh with and operate through the gear 22 to reverse the direction of rotation of the load. The gear 23 meshes and coöperates with the gears 19 to perform the functions hereinafter set forth.

The load shaft 2 has one or more radiating keys or splines 24, preferably three in the same plane. The hub or central portion of each of the gears 20, 21 and 22 is desirably provided with keyways or splineways 25 (Fig. 4) which receive the keys or splines 24 whereby any selected one of the central gears 20, 21 and 22 may be brought into power transmitting key and slot connection with the shaft 2 or may be freed of such connection since the keyways 25 extend clear through the keys in which they are formed, longitudinally of the shaft 2. The shaft 2 is preferably adjustable longitudinally of itself by mechanism hereinafter to be set forth whereby the keys 24 may be moved into engagement with any of the gears 20, 21 and 22 whereupon the selected gear turns with said shaft. The keyway 25 of the gear 20 is longer than the keyways of the gears 21 and 22 so that this gear 20 may be coupled with the shaft to turn therewith when the prime mover is directly connected with this shaft or when the gear 20 is employed to furnish the highest gear speed. The gears 20, 21 and 22 are provided with annular recesses 26 of axial length sufficient fully to receive the keys 24 at which time the shaft 2 is not in power transmitting connection with any gear. The gears 20, 21, 22 and 23 are desirably clear of the shaft 2 except for the connection afforded by the keys 24 whereby these gears, which thus are somewhat floating, are centered by the other gears. The gear 23 has an elongated hub 27 which carries a central clutch member 28 that is in fixed relation therewith. This clutch member turns in a fixed plane, being preferably unshiftable. It has clutching teeth 29 upon one side and clutching teeth 30 upon the other side. A non-rotatable clutch member 31 faces the teeth 29, this non-rotatable clutch member 31 being movable longitudinally of the shaft 2. A third clutching member 32 faces the teeth 30 of the clutch member 28 and is rigidly secured to the shaft 2. The clutch members 31 and 32 are together movable longitudinally of the shaft 2 although the clutch member 32 is permitted to rotate with the shaft 2 by being clamped in engagement therewith by the screw 33 while the clutch member 31 is prevented from rotating. To prevent the clutch member 31 from rotating I desirably provide it with two pins 34 extending longitudinally of the shaft 2 and which move back and forth in stationary sleeves 35 carried by the base 36 fixed upon the bed 37 of the gearing. When the clutching mechanism is adjusted as illustrated in Figs. 2 and 5, the clutch members 28 and 32 are coupled to establish fixed relation between the gear hub 27 and the shaft 2. The driving element 5 and the load shaft 2 are in direct driving relation as the gears 23 and 20 are of different diameters and are now held from relative rotation. As the gears 16, meshing with the gear 20, are of different diameters from the gears 19, meshing with the gear 23, the gears 16 and 19 cannot turn with respect to each other wherefore these gears, as well as the rest of the gears on the shafts 14 and 15, are locked from rotation. Thus all of the central gears and the planetary gears within the gear casing 9 are in rigid or locked relation, moving as a solid unit with the shaft 2 and the gear casing. With this adjustment the keys 23 are at the left hand ends of the key slots 25 in the gear 20. If it should be desired to operate the load shaft 2 through the intermediation of rotating gearing in order to change the speed of the shaft, the non-rotating clutch member 31 is moved to the right to engage the clutch member 28 and hold it from rotation and as the clutch member 31 and the clutch member 32 are movable together longitudinally of the shaft 2, the clutch member 32 is separated from the clutch member 28 when the clutch member 31 is engaged with the clutch member 28. As a consequence of the separation of the clutch member 32 from the clutch member 28 the direct connection between the driving element 5 and the shaft 2 is broken and as the keys 24 are now at the right hand ends of the keyways 25 of the gear 20, the connection between this gear and the shaft 2 remains. Power is transmitted to the shaft 2 through the gear 20 by way of the gears 16 in the planetary movement of these gears 16 about the gear 20. The shaft may be disconnected from the gear 20 before being connected with any other gear by moving the shaft longitudinally of itself until the keys 24 enter an annular space 26. The next gear speed ensues when the keys 24 enter the keyways 25 of the gear 21 whereupon the gears 17 are effective to transmit power at the reduced speed. The keys 24 may again be thrown into the annular recess 26 of the gears 21 and 22 upon further movement of the shaft 2 toward the right. Continued movement of this shaft in this direction brings the keys 24 into engagement with the keyways of the gear 22 to effect reversal in the direction of rotation of the shaft 2. Final movement of the shaft 2 toward the right will bring the keys 24 in the final recess 26 so that the shaft is again uncoupled.

Any preferred mechanism may be employed for shifting the gear members 31 and 32, the mechanism illustrated being preferable. The clutch member 32 terminates in a clutch collar 38 having an annular groove that receives the fork 39 whose stem is mounted upon a rod 40 which is movable longitudinally of the shaft 2 in a sleeve support 41 and in a lateral extension of the clutch member 31. This clutch member carries a rod 42 fixed thereon. This rod slips through a stationary sleeve 43 and has a collar 44 fixed thereon. A coiled spring 45 surrounds the rod 42 and serves, when free to act, to bring the clutch member 31 into engagement with the clutch member 28. An arm 46 is in fixed relation with the fork 39 and straddles the rod 42, the purpose of this arm being to press upon the collar 44 to withdraw the clutch member 31 from the clutch member 28 when the clutch member 32 is brought into engagement with the clutch member 28 by shifting the clutch fork 39 toward the clutch member 28. When the clutch member 31 is to be brought into engagement with the clutch member 28 and the clutch member 32 is to be brought out of engagement with the clutch member 28, the fork 39 is shifted away from the clutch member 28, the arm 46 being correspondingly shifted then to permit the spring 45 to effect engagement between the clutch member 31 and the clutch member 28. If the teeth of the clutch member 28 are not in line with the teeth upon the clutch member 31 when the spring 45 is permitted to function, the function of such spring will be delayed until there is the required alinement of such clutch teeth. The arm 46, clutch member 32 and the shaft 2 move together longitudinally of the shaft when the clutch member 32 is operated so that the keys 24 are brought into engagement with any selected central gear simultaneously with the movement of the clutch member 32, whose movements are functionless while it is separated from the clutch member 28. Thus the clutch fork 39 also serves as a speed changing device to control the longitudinal position of the shaft 2 and to select the particular central gear to be engaged by the keys 24. The fork 39 and parts moving therewith may be operated by any suitable handle mechanism, such as that illustrated, which includes a swinging lever 47 connected at 48 with a swinging link 49 which is suitably coupled with the stem of the fork 39. The lever 47 carries a detent 50 engageable with the various speed indicating notches 51, 52, 53 and 54 formed in a segmental rack 55. When the detent 50 is in the notch 51, the prime mover is directly coupled with the load. When the detent is engaged with the notch 52 the speed of the load is reduced by having power transmitted thereto with the highest gear speed. When the detent is in the notch 53, a lower gear speed of the load results and when the detent is in the notch 54, the direction of rotation of the load is reversed. In the movement of the detent from the notch 51 to the notch 52 the keys upon the shaft 2 remain in engagement with the central gear 20. When the detent is in a mid position between the notches 52 and 53 or between the notches 53 and 54, the keys 24 are in some recess 26 so that the shaft 2 then has no power transmitting connection with any central gear.

In order that the load which is operated by the shaft 2 may turn in a fixed plane, the shaft 2 may have sliding fit with a power transmitting sleeve 56 which is so shaped as to turn with the shaft. This power transmitting sleeve may be journaled in a bearing 57 supported upon the bed 37.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. Power transmission mechanism including a gear; a shaft co-axial with said gear and movable with respect thereto longitudinally of itself, said shaft having key formation while said gear has elongated keyway formation for receiving said key formation in different adjustments of the shaft longitudinally of itself with respect to said gear; a second gear co-axial with the first; mechanism for preventing the second gear from rotating and bringing the aforesaid key formation into one portion of the keyway formation and for freeing the second gear to permit its rotation and bringing the aforesaid key formation into engagement with another portion of the keyway formation.

2. Power transmission mechanism including a gear; a shaft co-axial with said gear and movable with respect thereto longitudinally of itself, said shaft having key formation while said gear has elongated keyway formation for receiving said key formation in different adjustments of the shaft longitudinally of itself with respect to said gear; a second gear co-axial with the first; mechanism for preventing the second gear from rotating and bringing the aforesaid key formation into one portion of the keyway formation and for freeing the second gear to permit its rotation and bringing the aforesaid key formation into engagement with another portion of the keyway formation; fixedly related gears in mesh with the aforesaid gears; and a carrier upon which said fixedly related gears are rotatably mounted and through which power is transmitted.

3. Power transmission mechanism including a gear; a shaft co-axial with said gear and movable with respect thereto longitudinally of itself, said shaft having key formation while said gear has elongated keyway formation for receiving said key formation in different adjustments of the shaft longitudinally of itself with respect to said gear; a second gear co-axial with the first; mechanism for preventing the second gear from rotating and bringing the aforesaid key formation into one portion of the keyway formation and for freeing the second gear to permit its rotation and for bringing the aforesaid key formation into engagement with another portion of the keyway formation; and an additional gear between and co-axial with the two first aforesaid gears, there being annular spacing between this additional gear and the first aforesaid gear fully to receive said key formation.

4. Power transmission mechanism including a gear; a shaft co-axial with said gear and movable with respect thereto longitudinally of itself, said shaft having key formation while said gear has elongated keyway formation for receiving said key formation in different adjustments of the shaft longitudinally of itself with respect to said gear; a second gear co-axial with the first; mechanism for preventing the second gear from rotating and bringing the aforesaid key formation into one portion of the keyway formation and for freeing the second gear to permit its rotation and for bringing the aforesaid key formation into engagement with another portion of the keyway formation; and an additional gear between and co-axial with the two first aforesaid gears, there being annular spacing between this additional gear and the first aforesaid gear fully to receive said key formation, there also being annular spacing between this additional gear and the second aforesaid gear also fully to receive said key formation.

5. Power transmission mechanism including a gear; a shaft co-axial with said gear and movable with respect thereto longitudinally of itself, said shaft having key formation while said gear has elongated keyway formation for receiving said key formation in different adjustments of the shaft longitudinally of itself with respect to said gear; a second gear co-axial with the first; mechanism for preventing the second gear from rotating and bringing the aforesaid key formation into one portion of the keyway formation and for freeing the second gear to permit its rotation and for bringing the aforesaid key formation into engagement with another portion of the keyway formation; an additional gear between and co-axial with the two first aforesaid gears, there being annular spacing between this additional gear and the first aforesaid gear fully to receive said key formation; fixedly related gears in mesh with the aforesaid gears; and a carrier upon which said fixedly related gears are rotatably mounted and through which power is transmitted.

6. Power transmission mechanism including a gear; a shaft co-axial with said gear and movable with respect thereto longitudinally of itself, said shaft having key formation while said gear has elongated keyway formation for receiving said key formation in different adjustments of the shaft longitudinally of itself with respect to said gear; a second gear co-axial with the first; mechanism for preventing the second gear from rotating and bringing the aforesaid key formation into one portion of the keyway formation and for freeing the second gear to permit its rotation and for bringing the aforesaid key formation into engagement with another portion of the keyway formation; an additional gear between and co-axial with the two first aforesaid gears, there being annular spacing between this additional gear and the first aforesaid gear fully to receive said key formation, there also being annular spacing between this additional gear and the second aforesaid gear also fully to receive said key formation; fixedly related gears in mesh with the aforesaid gears; and a carrier upon which said fixedly related gears are rotatably mounted and through which power is transmitted.

7. Power transmission mechanism including a plurality of co-axial gears; a shaft co-axial with these gears, said shaft being movable with respect to said gears longitudinally of itself, said gears and shaft having complemental formations permitting selective engagement between the shaft and gears; an additional gear co-axial with the aforesaid gears; mechanism for preventing and permitting the rotation of the additional gear and for changing the engagement of the shaft from one of the first aforesaid gears to another of the first aforesaid gears; a gear carrier through which power is transmitted; and fixedly related gears carried by said carrier and in mesh with the aforesaid gears.

8. Power transmission mechanism including a gear; a shaft co-axial with said gear and having key formation while said gear has elongated keyway formation for receiving said key formation; a second gear co-axial with the first; mechanism for preventing the second gear from rotating and bringing the aforesaid key formation into one portion of the keyway formation and for freeing the second gear to permit its rotation and bringing the aforesaid key formation into engagement with another portion of the keyway formation.

9. Power transmission mechanism including a gear; a shaft co-axial with said gear and having key formation while said gear has elongated keyway formation for receiving said key formation; a second gear co-axial with the first; mechanism for preventing the second gear from rotating and bringing the aforesaid key formation into one portion of the keyway formation and for freeing the second gear to permit its rotation and bringing the aforesaid key formation into engagement with another portion of the keyway formation; fixedly related gears in mesh with the aforesaid gears; and a carrier upon which said fixedly related gears are rotatably mounted and through which power is transmitted.

10. Power transmission mechanism including a gear; a shaft co-axial with said gear and having key formation while said gear has elongated keyway formation for receiving said key formation; a second gear co-axial with the first; mechanism for preventing the second gear from rotating and bringing the aforesaid key formation into one portion of the keyway formation and for freeing the second gear to permit its rotation and for bringing the aforesaid key formation into engagement with another portion of the keyway formation; and an additional gear between and co-axial with the two first aforesaid gears, there being annular spacing between this additional gear and the first aforesaid gear fully to receive said key formation.

11. Power transmission mechanism including a gear; a shaft co-axial with said gear and having key formation while said gear has elongated keyway formation for receiving said key formation; a second gear co-axial with the first; mechanism for preventing the second gear from rotating and bringing the aforesaid key formation into one portion of the keyway formation and for freeing the second gear to permit its rotation and for bringing the aforesaid key formation into engagement with another portion of the keyway formation; and an additional gear between and co-axial with the two first aforesaid gears, there being annular spacing between this additional gear and the first aforesaid gear fully to receive said key formation, there also being annular spacing between this additional gear and the second aforesaid gear also fully to receive said key formation.

12. Power transmission mechanism including a gear; a shaft co-axial with said gear and having key formation while said gear has elongated keyway formation for receiving said key formation; a second gear co-axial with the first; mechanism for preventing the second gear from rotating and bringing the aforesaid key formation into one portion of the keyway formation and for freeing the second gear to permit its rotation and for bringing the aforesaid key formation into engagement with another portion of the keyway formation; an additional gear between and co-axial with the first aforesaid gears, there being annular spacing between this additional gear and the first aforesaid gear fully to receive said key formation; fixedly related gears in mesh with the aforesaid gears; and a carrier upon which said fixedly related gears are rotatably mounted and through which power is transmitted.

13. Power transmission mechanism including a gear; a shaft co-axial with said gear and having key formation while said gear has elongated keyway formation for receiving said key formation; a second gear co-axial with the first; mechanism for preventing the second gear from rotating and bringing the aforesaid key formation into one portion of the keyway formation and for freeing the second gear to permit its rotation and for bringing the aforesaid key formation into engagement with another portion of the keyway formation; an additional gear between and co-axial with the two first aforesaid gears, there being annular spacing between this additional gear and the first aforesaid gear fully to receive said key formation; fixedly related gears in mesh with the aforesaid gears; and a carrier upon which said fixedly related gears are rotatably mounted and through which power is transmitted.

14. Power transmission mechanism including a plurality of co-axial gears; a shaft co-axial with these gears, said gears and shaft having complemental formation permitting selective engagement between the shaft and gears; an additional gear co-axial with the aforesaid gears; mechanism for preventing and permitting the rotation of the additional gear and for changing the engagement of the shaft from one of the first aforesaid gears to another of the first aforesaid gears; a gear carrier through which power is transmitted; and fixedly related gears carried by said carrier and in mesh with the aforesaid gears.

In witness whereof I hereunto subscribe my name this eighth day of November, A. D. 1918.

EMIL G. JOHANSON.